United States Patent Office 3,311,146
Patented Mar. 28, 1967

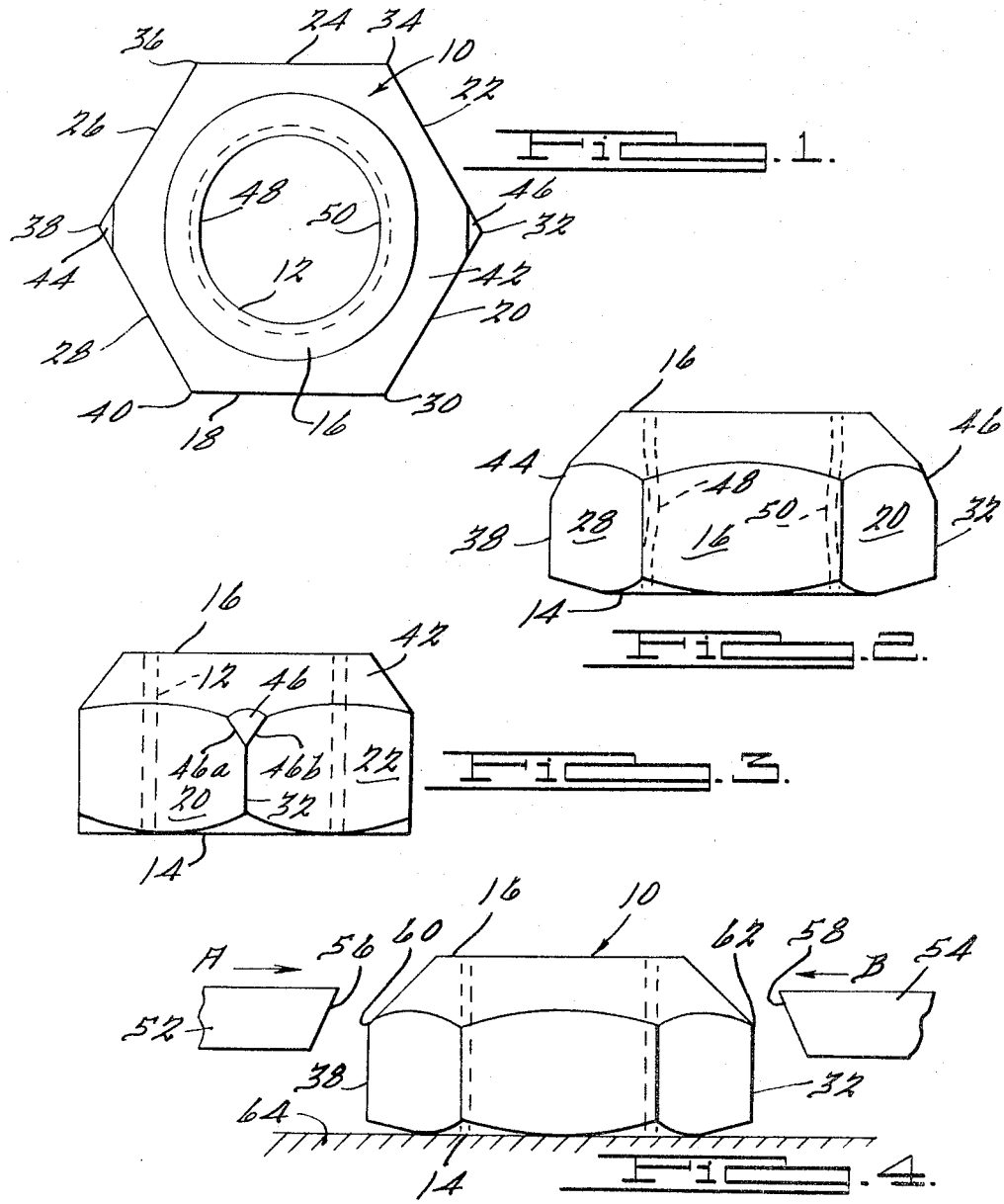

3,311,146
LOCK NUT
Harold A. Storch, Birmingham, Mich., assignor to Federal Screw Works, Detroit, Mich., a corporation of Michigan
Filed Mar. 1, 1965, Ser. No. 452,042
1 Claim. (Cl. 151—21)

This is a continuation-in-part of my copending United States application, Ser. No. 168,069, filed Jan. 23, 1962, and now Patent No. 3,171,459.

This invention relates to lock nuts.

It is an object of the present invention to provide a lock nut having locally distorted thread areas adapted to frictionally engage the male threaded member on which the nut is threaded and thereby produce a binding force preventing undesired loosening of the lock nut through vibration, shock, and the like.

It is another object of the present invention to provide a lock nut of the above character in which the locally distorted thread areas provide a high degree of gripping force on the male threaded member for the magnitude of distortion imparted thereto and which will maintain a high degree of gripping force on the male threaded member throughout repeated applications of the nut.

It is still another object of the present invention to provide a lock nut of the above character and a method for manufacturing same in which the distortion imparted to a nut body by a die or the like, will permanently reshape the metal in localized areas without undue tendency of the displaced metal to spring back toward its original shape.

It is a further object of the present invention to provide a lock nut of the above character which is particularly useful for the indentation of relatively large sizes of nuts in which a minimum amount of energy is required to indent the nut and in which the indentation of the nut does not collapse the entire body or appreciably disturb the overall configurations of the nut.

These and other objects of the invention will become apparent from the following detailed description taken in conjunction with the accompanying drawings wherein:

FIGURE 1 is a plan view of a lock nut embodying the present invention;

FIG. 2 is a front elevational view of the structure illustrated in FIG. 1;

FIG. 3 is a side elevational view of the structure illustrated in FIG. 1; and

FIG. 4 is a side elevational view of a standard hex nut from which the lock nut of the invention is made, showing the indenting dies used for indenting said nut to produce the nut of the present invention.

Referring now to the drawings, the lock nut of the present invention will be seen to be made from a standard hexagonal or "hex" nut which has been subjected to an indenting operation. This lock nut includes a steel body 10 having a central threaded bore 12 extending from a lower end surface or seat 14 to a top end surface 16 thereof. The outer periphery of the nut body 10 is of regular polygonal cross section and is defined by six flat side walls 18, 20, 22, 24, 26, and 28, which are separated by six edges 30, 32, 34, 36, 38, and 40. The various side walls and edges are disposed parallel to the axis of the bore 12. The nut body 10 may be provided with a conical or chamfered end surface 42 extending between the side walls 18–28 and the top end surface 16.

A nut having the foregoing features is well known in the art and constitutes a common hex nut. Such a nut is transformed into a lock nut according to the present invention by indenting it as hereinafter described. The nut illustrated herein is shown as having a diametrically opposite pair of indentations which are defined on their radially outer sides by a pair of indentation surfaces 44 and 46. Said indentations are defined on their radially inner sides by pairs of radially inwardly displaced thread areas 48 and 50. The indentations will be seen to be generally centered with respect to a plane which includes both the axis of the bore 12 and an opposite pair of edges 32 and 38. The indentation surfaces 44 and 46 are flat and are of generally triangular shape, although because of the chamfered surface 42, the upper edges of the surfaces 44 and 46 are somewhat arcuate. Each indentation surface is further distinguished by the fact that it is disposed at an acute angle to its adjacent edge 38 or 32. The indentation surfaces 44 and 46 are identical and, as shown in FIG. 3 at 46a and 46b, each is provided with diverging edges emanating from a common point on its adjacent edge 32 or 38. The indentation surfaces 44 and 46 will be seen to be of a width substantially less than the width of the side walls 18–28. In the particular example illustrated herein, the indentation surfaces 44 and 46 are disposed at angles of about 16° to the axis of the bore 12. While a variety of different angles might be selected, an angle of between about 5° and 25° is preferred.

FIG. 5 illustrates a suitable apparatus and method which may be used to indent a common hex nut to form the nut illustrated in FIGS. 1, 2 and 3. FIG. 4 shows the nut body 10, prior to its indentation, positioned a pair of indentor dies 52 and 54, having flat nut-engaging surfaces 56 and 58. The indentor die 52 is movable in the direction of the arrow A and the indentor die 54 is movable in the direction of the arrow B, such directions being perpendicular to the bore 12 and perpendicular to the nut body edges 30–40. The nut body 10 is illustrated with the edges 32 and 38 disposed in alignment with the indentor dies 52 and 54. The faces 56 and 58 of the indentor dies are disposed at an angle to the edges 32 and 38, this angle being equal to the angle which it is desired to impart to the indentation surfaces 44 and 46. The indentor dies 52 and 54 are moved radially inwardly with respect to the nut body and toward one another to contact the edges 32 and 38 at upper corners 60 and 62 thereof, respectively. In other words, the surfaces 56 and 58 initially make point contact with the nut body 10. As the indentor dies continue their radially inward travel, they produce the flat indentation surfaces 44 and 46 which are illustrated in FIGS. 1–3, and radially inwardly displace the adjacent portions of the threaded bore 12, thereby forming the displaced thread areas 48 and 50. The nut body 10 is shown resting upon a supporting surface 64.

It will be seen that in the method illustrated herein the indentor dies initially make point contact with the work and the work presents a very small mass of material to be displaced. Further, the work initially offers very little resistance to the movement of the indentor dies, this being substantially less than is the case in previously known methods for indenting lock nuts, particularly where the indentation is made on a side wall of a nut body. Also, because of the limited area of contact of the indentor die with the nut body, it has been found possible to confine the indentation to a relatively limited area and thereby insure the presence of adequate starting threads adjacent the seat 14. Particularly in the indentation of massive nut bodies 10, the indenting of a nut as illustrated herein enables the production of sufficiently adequate displaced thread areas 48 and 50 without producing undesired overall deformation of the nut body 10.

While the preferred embodiments of the invention illustrated herein are well calculated to fulfill the objects above stated, it will be appreciated that the invention is subject to modification, variation, and change without departing from the fair meaning or scope of the subjoined claim.

What is claimed is:

A lock nut comprising a nut body having a threaded bore extending between the opposite ends thereof, an even number of contiguous outer flat side walls of equal width converging along axial edges extending parallel to the thread axis and spaced equally from the thread axis, an annular end surface at the upper end thereof contiguous to said side walls and inclined with respect to said side walls and the thread axis, a plurality of symmetrically spaced indentations each of which is disposed in a location generally centered with respect to a radial plane including one of said edges, each of said indentations being located at one end of one of said edges and being defined on its outer surface by a generally planar indentation surface which is inclined with respect to said side walls and to the thread axis but which is disposed at a lesser angle of inclination relative to the thread axis than is said end surface, said indentation surface having at least one-half of its axial extent located beneath said end surface and being bounded at its lower extremity by a pair of edges which intersect at the adjacent one of said axial edges and diverge upwardly away from one another toward said end surface, and said indentations being defined on their radially inner sides by thread areas of said bore which are displaced radially inwardly of the normal thread diameter.

References Cited by the Examiner

UNITED STATES PATENTS

| | | |
|---|---|---|
| 2,592,128 | 4/1952 | Engstrom. |
| 2,679,879 | 6/1954 | Engstrom. |
| 2,686,546 | 8/1954 | Mac Lean. |
| 3,171,459 | 3/1965 | Storch _____ 151—218 |
| 3,208,494 | 9/1965 | Skidmore. |

FOREIGN PATENTS

| | | |
|---|---|---|
| 10,396 | 8/1886 | Great Britain. |

CARL W. TOMLIN, *Primary Examiner.*

G. A. MILWICK, R. S. BRITTS, *Assistant Examiners.*